United States Patent [19]
Saito et al.

[11] Patent Number: 5,098,773
[45] Date of Patent: Mar. 24, 1992

[54] MAGNETIC RECORDING MEDIUM

[75] Inventors: Shinji Saito; Hiroo Inaba; Hiroshi Ogawa; Hitoshi Noguchi, all of Kanagawa, Japan

[73] Assignee: Fuji Photo Film Co., Ltd., Kanagawa, Japan

[21] Appl. No.: 492,164

[22] Filed: Mar. 13, 1990

[30] Foreign Application Priority Data

Mar. 14, 1989 [JP] Japan .................. 1-61321

[51] Int. Cl.$^5$ .............................................. G11B 23/00
[52] U.S. Cl. ................................. 428/212; 428/329; 428/336; 428/694; 428/900
[58] Field of Search ............... 428/329, 694, 900, 212, 428/336

[56] References Cited

U.S. PATENT DOCUMENTS 4,506,000  3/1985  Kubota et al. ............... 428/69 X
4,959,263  9/1990  Aonuma et al. .................. 428/900

Primary Examiner—Paul J. Thibodeau
Attorney, Agent, or Firm—Sughrue, Mion, Zinn, Macpeak & Seas

[57] ABSTRACT

A magnetic recording medium having at least two magnetic layers is disclosed, comprising first and second mangetic layers which are successively formed in order on a nonmagnetic support, wherein a coercive force (Hc) of said second magnetic layer is $5 \times 10^4$ to $1.5 \times 10^5$ A/m, a ratio (Br/Hc) of a residual magnetic flux density (Br) of said second magnetic layer to the coercive force (Hc) is $2.0 \times 10^{-6}$ H/m or more, SFD of said second magnetic layer is 0.6 or less, an average length in the long axis of magnetic particles in said second magnetic layer is 0.25 microns or less, a center line average surface roughness (Ra) of said second magnetic layer is 1/10 or less of the average length in the long axis of the magnetic particles, and a coercive force (Hc') of said first magnetic layer is $2 \times 10^4$ to $1 \times 10^5$ A/m.

15 Claims, No Drawings

MAGNETIC RECORDING MEDIUM

FIELD OF THE INVENTION

The present invention relates to a magnetic recording medium comprising plural magnetic layers (i.e., at least two magnetic layers), and more particularly it relates to a magnetic recording medium having excellent electromagnetic characteristics.

BACKGROUND OF THE INVENTION

It is well known that magnetic layers are superimposed upon each other to increase the electromagnetic characteristics of a magnetic recording medium.

When a magnetic recording medium comprising plural magnetic layers is used, upper and lower magnetic layers can differ from each other in coercive force (Hc), residual magnetic flux density (Br), or the size of magnetic particles (which is represented by crystallite size or specific surface area). As a result, output at a wide range of frequencies increases, thereby improving electromagnetic characteristics. See, for example, in JP-A-52-51908 (The term "JP-A" as used herein means an "unexamined published Japanese patent application"), JP-A-54-21304, JP-A-54-48504, JP-A-58-56228, JP-A-58-56229, and JP-A-53-54002.

However, magnetic recording media, such as an audio tape, a video tape, or a magnetic disk, now require higher density recording, higher output, and lower noise. Therefore, even if a magnetic tape comprising plural magnetic layers is used, the electromagnetic characteristics of it are insufficient.

JP-A-54-48504 shows that the coercive force (Hc) of the second magnetic layer (i.e., upper magnetic layer) is 590 to 800 Oe (which corresponds to $4.7 \times 10^4$ A/m to $6.4 \times 10^4$ A/m), the residual magnetic flux density (Br) is 1200 gauss or more (which corresponds to $1.2 \times 10^{-1}$ wb/m$^2$ or more), a ratio of Br/Hc is $2.55 \times 10^{-6}$ H/m or more, and the coercive force of the first magnetic layer is 400 to 560 Oe (which corresponds to $3.18 \times 10^4$ A/m to $4.45 \times 10^4$ A/m). However, with such a combination of parameters, chroma output and S/N ratio increase, whereas RF output and YS/N ratio are insufficient. This is because the Hc value in magnetic recording media comprising plural magnetic layers is insufficient for high density recording; even if Hc is increased, packing density is low, and sufficient output cannot be obtained; even if the particle size in an upper magnetic layer is small, surface property threof is insufficient, and the reduction of noise is insufficient; if the thickness of an upper magnetic layer is thick, the effects due to plural magnetic layers are difficult to obtain; and if magnetic characteristics of upper and lower magnetic layers are not appropriate for the magnetic field of a magnetic head, for example, if Hc of a lower magnetic layer is too high, the recording is insufficient.

The present inventors have made extensive studies and consequently discovered a magnetic recording medium having excellent electromagnetic characteristics.

SUMMARY OF THE INVENTION

Accordingly, an object of the present invention is to provide a magnetic recording medium having plural magnetic layers (i.e., at least two magnetic layers) in which electromagnetic characteristics such as RF output, YS/N and chroma S/N, etc., are significantly improved, and higher output as well as lower noise is effected.

Another object of the present invention is to provide a magnetic recording medium in which self-demagnetization is low with impoved short wave length recording.

These objects can be attained by a magnetic recording medium having at least two magnetic layers comprising first (lower) and second (upper) magnetic layers which are successively formed in order on a nonmagnetic support, wherein a coercive force (Hc) of said second magnetic layer is $5 \times 10^4$ to $1.5 \times 10^5$ A/m, a ratio (Br/Hc) of a residual magnetic flux density (Br) of said second magnetic layer to the coercive force (Hc) is $2.0 \times 10^{-6}$ H/m or more, SFD of said second magnetic layer is 0.6 or less, an average length in the long axis of magnetic particles in said second magnetic layer is 0.25 microns or less, a center line average surface roughness (Ra) of said second magnetic layer is 1/10 or less of the average length in the long axis of the magnetic particles, and a coercive force (Hc') of said first magnetic layer is $2 \times 10^4$ to $1 \times 10^5$ A/m.

DETAILED DESCRIPTION OF THE INVENTION

The reason why the magnetic recording medium of the present invention has excellent electromagnetic characteristics is thought to be as follows. It is necessary to heighten Hc of the second magnetic layer which is present in the vicinity of a magnetic head and conducts the short wave length recording to $5 \times 10^4$ A/m or more in order to decrease self-demagnetization. Hc is preferably $6 \times 10^4$ A/m or more and particularly preferably $8 \times 10^4$ to $12 \times 10^4$ A/m; however, Hc of more than $1.5 \times 10^5$ A/m is undesirable because it is difficult to record threin using a magnetic head. Increased Hc is disadvantageous for recording long wave signals, so that output is lowered. It has turned out that these problems can be improved by increasing the packing density, the squareness ratio, and the residual magnetic flux density Br (Wb/m$^2$) of the second magnetic layer. It has also turned out that these problems can be further improved when a ratio of Br/Hc is made to be $2.0 \times 10^{-6}$ H/m or more, preferably $2.5 \times 10^{-6}$ H/m or more and more preferably $3 \times 10^{-6}$ H/m or more.

In addition, it has been found that such improvement is further increased when SFD is made to be 0.6 or less. SFD is an abbreviation for "Switching Field Distribution", and means the distribution of Hc contained in a magnetic layer (i.e., the distribution of reversal magnetic field), and is expressed as a value which is obtained by dividing the half- width of the differential curve in a magnetic hysteresis curve at a magnetic field of 5 K Oe by Hc.

It is uncertain how electromagnetic characteristics are increased due to SFD of 0.6 or less. However, it can be assumed that due to a narrow distribution of Hc, the low Hc component which is liable to self-demagnetize and the high Hc component which causes recording to be more difficult are decreased, so that magnetization content attributed to reproduction is increased.

The SFD is preferably 0.5 or less, more preferably 0.3 or less.

It is preferred that the coercive force (Hc') of the first magnetic layer is lower than the coercive force (Hc) of the second magnetic layer; otherwise, sufficient recording cannot be made in the first magnetic layer under a decreasing magnetic field of the magnetic head. The coercive force of the first magnetic layer is in the range of $2 \times 10^4$ to $1 \times 10^5$ A/m, preferably $3 \times 10^4$ to $8 \times 10^4$ A/m and more preferably $4 \times 10^4$ to $7 \times 10^4$ A/m. When the coercive force of the first magnetic layer is more than $1 \times 10^5$ A/m, recording is difficult under the magnetic field of the magnetic head. Coercive force of the first magnetic layer of less than $2 \times 10^4$ A/m is not preferred because self-demagnetization occurs. When a ratio (Br'/Hc') of a residual magnetic flux density (Br') of the second magnetic layer to a coercive force (Hc') of the second magnetic layer is $2.0 \times 10^{-6}$ H/m or more, preferably $2.5 \times 10^{-6}$ H/m or more and more preferably $3 \times 10^{-6}$ H/m or more, sufficient output can be obtained even if the magnetic field of the magnetic head is small.

When the thickness of the second magnetic layer is preferably 1.5 microns or less, the electromagnetic characteristics significantly increase. It is particularly preferred that the thickness of the second magnetic layer be 1.0 micron or less.

The present inventors have found that when an average length in the long axis of magnetic particles in the second magnetic layer is 0.25 microns or less, and a center line average surface roughness (Ra) (the cut off value: 0.025 mm) of the second magnetic layer is 1/10 or less, preferably 1/20 or less, more preferably 1/40 or less, of the average length in the long axis of the magnetic particles, noise becomes very low.

The average length in the long axis of the magnetic particles in the second magnetic layer is 0.25 microns or less, preferably 0.20 microns or less, more preferably 0.15 microns or less. In the magnetic particles of the second magnetic layer, a ratio of the short axis to the long axis, namely an acicular ratio, is preferably 2 to 20 and more preferably 4 to 14. The term "long axis" refers to the longest axis among three axes, and the term "short axis" refers to the shortest axis among three axes.

A specific surface area ($S_{BET}$) of the magnetic particles of the second magnetic layer is generally 25 to 80 m$^2$/g, preferably 35 to 60 m$^2$/g, according to the BET method. When the specific surface area is less than 25 m$^2$/g, noise becomes high, whereas when it is more than 80 m$^2$/g, it is difficult to obtain a good surface property.

The crystallite size of magnetic particles in the second magnetic layer is generally 450 to 100 angstroms, preferably 350 to 150 angstroms.

When the average length in the long axis and the crystallite size, of magnetic particles in the first magnetic layer are larger than those of the second magnetic layer, and when the specific surface area of magnetic particles of the first magnetic layer is smaller than that of the second magnetic layer, the particles are easy to disperse, thereby providing an excellent surface property.

In the magnetic recording medium of the present invention, when magnetic properties are measured under a magnetic field of 5 K Oe, the squareness ratio of the second magnetic layer in the tape-running direction is preferably 0.70 or more, preferably 0.80 or more, more preferably 0.90 or more. The squareness ratio of the first magnetic layer may be smaller than that of the second magnetic layer; however, desirably, it is 0.80 or more.

As the squareness ratio of the second magnetic layer is increased, SFD of the second magnetic layer is liable to be 0.6 or less.

It is preferred that in the first and second magnetic layers, the squareness ratios in the direction perpendicular to the tape-running directions be 80 % or less of the values in the tape-running direction.

The SFD of the first magnetic layer may be larger than that of the second magnetic layer; however, it is preferably 0.6 or less, more preferably 0.5 or less and most preferably 0.4 or less.

The saturation magnetization ($\sigma s$) of magnetic particles in the second magnetic layer is 50 emu/g or more, preferably 70 emu/g or more, and when the magnetic particles are ferromagnetic particles, it is preferred that the saturation magnetization ($\sigma s$) is 100 emu/g or more. The saturation magnetization ($\sigma s'$) of magnetic particles in the first magnetic layer may be smaller than that of the second magnetic layer; however, it is preferably 50 emu/g or more and more preferably 70 emu/g or more.

It is preferred that r/500 of magnetic particles in the second magnetic layer be less than that of the first magnetic layer; it may be 1.5 or less. The magnetic particles in the first and second magnetic layers preferably have a r/500 of 1.0 or less.

The term "r/500" means a residual magnetization amount (%) wherein magnetic recording media are subjected to saturation magnetization, and then a magnetic field of 1500 Oe is applied to them in an opposite direction.

The magnetic particles in the first and second magnetic layers preferably have a water content of 0.01 to 2 wt %. It is preferred that the water content of the magnetic particles be controlled according to the kind of binder used.

The tap density of magnetic particles in the second magnetic layer is preferably 0.5 g/ml or more, more preferably 0.8 g/ml or more.

The tap density of magnetic particles in the first magnetic layer may be smaller than that of the second magnetic layer; however, desirably, it is 0.6 g/ml or more.

When the magnetic particles in the first magnetic layer comprise a cobalt-modified iron oxide, a ratio of bivalent iron to trivalent iron is preferably 0 to 20 atom %, more preferably 5 to 10 atom %. Also, a ratio of cobalt atoms to iron atoms is 0 to 15 atom %, preferably 3 to 8 atom %.

It is preferred that the pH of magnetic particles in the first and second magnetic layers be controlled by selecting binders. The pH is in the range of 4 to 12, preferably 6 to 10.

At least one of the magnetic particles in the first magnetic layer and the magnetic particles in the second magnetic layer, if desired, may be surface-treated with materials such as Al, Si, P, or oxides thereof. When such materials are used in an amount of 0.1 to 10 atom % based on the magnetic particles, lubricating agents such as fatty acids are preferably absorbed into the the magnetic particles in an amount of 100 mg/m$^2$ or less, thus leading to good effects.

The magnetic particles in the first and second magnetic layers can contain soluble inorganic ions such as Na, Ca, Fe, Ni, or Sr in an amount of 500 ppm or less without affecting characteristics thereof.

Examples of the magnetic particles in the first and second magnetic layers include conventional ferromagnetic particles such as gamma-FeOx (x=1.33 to 1.5); Co-modified gamma-FeOx (x=1.33 to 1.5); ferromagnetic alloy particles containing Fe, Ni, or Co as a main component (75% or more); barium ferrite; or strontium ferrite. These ferromagnetic particles may contain, other than predetermined atoms, Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, or B. Such ferromagnetic particles, before they are dispersed, may be in advance treated with dispersing agents, lubricating agents, surface active agents, or antistatic agents, which will be described later.

The ferromagnetic alloy particles may contain a small amount of hydroxides, or oxides.

Ferromagnetic alloy particles can be obtained using known manufacturing methods. Examples of such methods include a method in which reduction is conducted using a reducing gas such as complex organic acid salts (e.g., oxalates) and hydrogen; a method in which an iron oxide is reduced using a reducing gas such as hydrogen to obtain particles of Fe or Fe-Co; a method in which metal carbonyl compounds are pyrolyzed; a method in which a reducing agent such as sodium boron hydride, hypophosphites, or hydrazine is added to an aqueous solution of ferromagnetic metal to effect reduction; and a method in which metal is evaporated in an inert gas under reduced pressure to obtain fine powders thereof.

The ferromagnetic alloy particles thus obtained may be subjected to a conventional gradual-oxidizing method such as a method in which they are immersed in organic solvents, followed by drying; a method in which they are immersed in organic solvents, and then an oxide film is formed thereon using an oxygen-containing gas, followed by drying; and a method in which an oxide film is formed thereon without using organic solvents by regulating the partial pressures of oxygen gas and of an inert gas.

It is preferred that the number of pores in the magnetic particles used in the present invention is as small as possible, preferably 20% by volume or less, more preferably 5% by volume or less.

The magnetic particles used in the present invention can be manufactured using known methods. If the characteristics of the size of the magnetic particles mentioned above are satisfied, the shape of the magnetic particles may be acicular, granular, ellipsoidal, or plate-like shapes.

In order that the second magnetic layer has SFD of 0.6 or less, it is necessary that the Hc thereof is narrowly distributed. To this end, there can be adopted various methods for manufacturing magnetic particles, such as a method in which the reaction temperature for growing a seed is increased from 20° C. to 40° C. so that goethite particles can be widely distributed; a method in which when gamma-hematite is calcined, the surface of goethite is treated with water glass, thereby preventing gamma-hematite from being sintered; and a method in which regarding cobalt-modified iron oxide, the adhesion rate of cobalt is slower than in the prior art.

In the present invention, the binder for forming the first and second magnetic layers can be a thermoplastic resin, a thermosetting resin, a reactive type resin, or a mixture thereof, which binders are conventionally known.

The thermoplastic resin includes those having a glass transition temperature of −100° to 150° C., a number average molecular weight of 1,000 to 200,000, preferably 10,000 to 100,000, and a degree of polymerization of about 50 to 1,000. Examples of such resins include polymers or copolymers in which vinyl chloride, vinyl acetate, vinyl alcohol, maleic acid, acrylic acid, acrylic ester, vinylidene chloride, acrylonitrile, methacrylic acid, methacrylic acid ester, styrene, butadiene, ethylene, vinyl butyral, vinyl acetal, or vinyl ether, etc., are contained as a constituent unit; polyurethane resins; and various rubber resins.

Examples of the thermosetting resins or the reactive type resin include phenolic resins, epoxy resins, hardenable polyurethane resins, urea resins, melamine resins, alkyd resins, reactive acrylic resins, formaldehyde resins, silicone resins, epoxy polyamide resins, a mixture of polyester resins and isocyanate prepolymers, a mixture of polyester polyols and polyisocyanates, and a mixture of polyurethanes and polyisocyanates.

The above resins are disclosed in detail in "Plastic Handbook" by Asakura Shoten Co., Ltd.

A conventional electron radiation hardening resin can be used for forming the first and second magnetic layers. Examples of such resins and methods for manufacturing them are disclosed in detail in JP-A-62-256219.

The above resins can be used singly or in combination. Typical examples of such combinations of thermoplastic resins include a combination of a polyurethane resin and at least one kind selected from the group consisting of vinyl chloride resins, vinyl chloride/vinyl acetate copolymers, vinyl chloride/vinyl acetate/vinyl alcohol copolymers, and vinyl chloride/vinyl acetate/maleic anhydride copolymers; and a combination of such resins and polyisocyanates.

Conventional polyurethane resins such as polyester polyurethanes, polyether polyurethanes, polyether polyester polyurethanes, polycarbonate polyurethanes, polyester polycarbonate polyurethanes, or polycaprolactam polyurethanes can be used.

In order for the binder to have excellent dispersibility and durability, it is preferred that at least one polar group selected from the group consisting of —COOM, —SO$_3$M, —OSO$_3$M, —P=O(OM)$_2$, —O—P=O(OM)$_2$, (wherein M represents a hydrogen atom, or an alkali metal group), —OH,

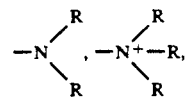

(wherein R represents hydrocarbon group), epoxy groups, —SH, and —CN is introduced into the binder using a copolymerization reaction or an addition reaction.

The content of such polar groups is $1 \times 10^{-1}$ to $1 \times 10^{-8}$ mol/g, preferably $1 \times 10^{-2}$ to $1 \times 10^{-6}$ mol/g.

Examples of such binders include VAGH, VYHH, VMCH, VAGF, VAGD, VROH, VYES, VYNC, VMCC, XYHL, XYSG, PKHH, PKHJ, PKHC, and PKFE (which are produced by Union Carbide Co., Ltd.); MPR-TA, MPR-TA5, MPR-TAL, MPR-TSN, MPR-TMF, MPR-TS, and MPR-TM (which are produced by Nissin Chemical Industry Co., Ltd.); 1000W, DX80, DX81, DX82, and DX83 (which are produced by Denki Kagaku Co., Ltd.); MR110, MR100, and 400X110A (which are produced by Nippon Zeon Co., Ltd.); Nippollan N2301, N2302, and N2304 (which are produced by Nippon Polyurethane Co., Ltd.); Pandex T-5105, T-R3080, T-5201, Burnock D-400, D-210-80, Crisvon 6109, and Crisvon 7209 (which are produced by Dainippon Ink Co., Ltd.); U-Vylon R 8200, UR-8300, RV 530, and RV 280 (which are produced by Toyobo Co., Ltd.); Daipheramine 4020, 5020, 5100, 5300, 9020, 9022, and 7020 (which are produced by Dainichi Seika Co., Ltd.); MX5004 produced by Mitsubishi Kasei Co., Ltd.; Sunprene SP-150 produced by Sanyo Kasei Co., Ltd.; and Salan F310, and F210 produced by Asahi Kasei Co., Ltd.

The binders for forming the first and second magnetic layers are used in an amount of 5 to 50% by weight, preferably 10 to 30% by weight, per magnetic particles of each magnetic layer. When vinyl chloride resin is used, it is preferably used in an amount of 5 to 30% by weight; when polyurethane resin is used, it is preferably used in an amount of 2 to 20% by weight, and when polyisocyanate resin is used, it is preferably used in an amount of 2 to 20% by weight. It is preferred to use these resins in combination.

When a polyurethane is used as a binder, it is preferred that it has a glass transition temperature of $-50°$ to $100°$ C., a breaking extension of 100 to 2000%, a breaking stress of 0.05 to 10 $Kg/cm^2$, and an yield point of 0.05 to 10 $Kg/cm^2$.

The magnetic recording medium of the present invention comprises at least two magnetic layers. Therefore, if desired, it is possible that the content of the binders, the content of vinyl chloride resins, polyurethane resins, polyisocyanates, or other resins, the molecular weight of each resin contained in the magnetic layers, the content of polar groups, or the physical properties of these resins can be changed between the first and second magnetic layers.

Examples of the polyisocyanates to be used in the present invention include isocyanates such as tolylene diisocyanate, 4-4'-diphenylmethane diisocyanate, hexamethylene diisocyanate, xylylene diisocyanate, naphthylene-1,5-diisocyanate, o-toluidine diisocyanate, isophorone diisocyanate, triphenylmethane triisocyanate; and the reaction products of these isocyanates and polyalcohols; and polyisocyanates produced by condensing these isocyanates. Such isocyanates are commercially available under the trade names of "Coronate L", "Coronate HL", "Coronate 2030", "Coronate 2031", "Millionate MR", "Millionate MTL" (produced by Nippon Polyurethane Co., Ltd.); "Takenate D-102", "Takenate D-110N", "Takenate D-200", "Takenate D-202" (produced by Takeda Chemical Industries Co., Ltd.); and "Desmodule L", "Desmodule IL", "Desmodule N", "Desmodule HL" (produced by Sumitomo Bayer Co., Ltd.). These isocyanates can be used alone or in mixture in the first and second magnetic layers by taking advantage of the differences in their hardening reactivities.

As carbon black, furnace for rubber, thermal for rubber, black for coloring, or acetylene black etc., can be used.

Regarding the properties of carbon black, it is preferred that the specific surface area ($S_{BET}$) be 5 to 500 $m^2/g$, the DBP oil absorption amount be 10 to 400 ml/100g, the average particle size be 5 to 300 millimicrons, the pH be 2 to 10, the water content be 0.1 to 10 wt %, and the tap density be 0.1 to 1 g/ml.

Examples of carbon black to be used in the present invention include BLACKPEARLS 2000, 1300, 1000, 900, 800, and 700, and VULCAN XC-72 (produced by Cabot Co., Ltd.); #80, #60, #55, #50, and #35 (produced by Asahi Carbon Co., Ltd.); #2400B, #2300, #900, #1000, #30, #40, and #10B (produced by Mitsubishi Kasei Co., Ltd.); and CONDUCTEXSC, RAVEN 150, 50, 40, and 15 (produced by Columbia Carbon Co., Ltd.).

Carbon black may be subjected to surface-treatment using dispersing agents, or may be graphited using resins. Carbon black in which a part of its surface is graphited may be used. Before carbon black is added to a magnetic coating composition, it may be in advance dispersed with binders.

These carbon blacks can be used alone or in combination in the first and second magnetic layers. It is preferred that the content of carbon black be 0.1 to 30 % by weight based on magnetic particles in each of the first and second magnetic layers.

Carbon black serves to prevent an electrification property, to lower friction coefficient, to provide a light screen property, and to increase film strength. These actions of carbon black vary according to the kind thereof. Therefore, the kind, amount, and combination of carbon black in the first and second magnetic layers can be changed by considering the particle size, oil absorption amount, electric conductivity, or pH. For example, when carbon black having a high electrical conductivity is used for forming the first magnetic layer, electrification property is prevented, and when carbon black having a large particle size is used for forming the second magnetic layer, friction coefficient is lowered.

Examples of the carbon black which can be used in the present invention are described in "Carbon Black Binran" by Carbon Black Association.

Examples of abrasive agents which can be used in the present invention include known materials having a Mohs' hardness of 6 or higher such as alpha-alumina having an alpha-conversion of 90 % or more, beta-alumina, silicon carbide, chromium oxide, potassium oxide, alpha-iron oxide, corundum, synthetic diamond, silicon nitride, silicon carbide, titanium carbide, titanium oxide, silicon dioxide, or boron nitride. These are used alone or in combination. A composite of such abrasive agents (i.e., abrasive agents treated with other abrasive agents) may be used. These abrasive agents may contain some compounds or elements other than the chief ingredient, and the effects of the abrasive agents remain unchanged if the chief ingredient is 90% or more.

The particle size of these abrasive agents is preferably 0.01 to 2 microns. When abrasive agents, the particle sizes of which differs from each other, are combined, or when a single kind of abrasive agent in which the distribution of the particle size is made wide is used, similar effects can be maintained.

It is preferred that the abrasive agents have a tap density of 0.3 to 2 g/ml, a water content of 0.1 to 5%, a pH of 2 to 11, and a specific surface area ($S_{BET}$) of 1 to 30 $m^2/g$.

The abrasive agents which can be used in the present invention may have any of acicular, spherical or die-like shapes. Abrasive agents in which a part of their shape has an edge are preferably used, because the abrasive property thereof becomes higher.

Examples of such abrasive agents include AKP-20, AKP-30, AKP-50, and HIT-50 produced by Sumitomo Chemical Co., Ltd., G5, G7, S-1 produced by Nihon Chemical Industry Co., Ltd., 100ED, and 140ED produced by Toda Kogyo Co., Ltd.

The kind, amount, and combination of the abrasive agents in the first and second magnetic layers can be varied depending upon the object. For example, the durability of the magnetic layer surface can be improved by increasing the amount of abrasive agents in the second magnetic layer, and the durability of the edge of the magnetic layers can be improved by increasing the amount of abrasive agents in the first magnetic layer.

These abrasive agents are in advance dispersed with binders, and then may be added to a magnetic coating composition.

It is preferred that abrasive agents present in the surface as well as edge of the magnetic layers be present in an amount of 5 pieces/100 microns $m^2$ or more.

In the present invention, additives which have lubricating effect, antistatic effect, dispersing effect, or plasticizing effect can be used.

Examples of such additives include molybdenum disulfide; tungsten disulfide; graphite; boron nitride; fluorinated graphite; silicone oils; silicones having polar groups; fatty acid-modified silicones; fluorine-containing silicones; fluorine-containing alcohols; fluorine-containing esters; polyolefines; polyglycols; alkyl phosphoric acid esters and their alkali metal salts; alkyl sulfuric acid esters and their alkali metal salts; polyphenyl ethers; fluorine-containing alkyl sulfuric esters and their alkali metal salts; monobasic fatty acids having 10 to 24 carbon atoms (which may contain an unsaturated bond or may be branched) and their metal salts (e.g., Li, Na, K, Cu); monovalent, divalent, trivalent, tetravalent, pentavalent, and hexavalent alcohols having 12 to 22 carbon atoms (which may contain an unsaturated bond or may be branched); alkoxy alcohols having 12 to 22 carbon atoms; mono fatty acid esters or di fatty acid esters or tri fatty acid esters, each consisting of monobasic fatty acid having 10 to 24 carbon atoms (which may contain an unsaturated bond or may be branched) and any one of monovalent, divalent, trivalent, tetravalent, pentavalent, and hexavalent alcohols having 2 to 12 carbon atoms (which may contain an unsaturated bond or may be branched); fatty acid esters of mono alkyl ethers of alkylene oxide polymers; fatty acid amides having 8 to 22 carbon atoms; and aliphatic amines having 8 to 22 carbon atoms.

Examples of such alcohols, acids, or esters include lauric acid, myristic acid, palmitic acid, stearic acid, behenic acid, butyl stearate, oleic acid, linoleic acid, linolenic acid, elaidic acid, octyl stearate, amyl stearate, isooctyl stearate, octyl myristate, butoxyethyl stearate, anhydrosorbitan monostearate, anhydrosorbitan distearate, anhydrosorbitan tristearate, oleyl alcohol, and lauryl alcohol.

In addition, there can be used nonionic surface active agents such as alkylene oxides, glycerines, glycidols, or alkylphenol ethylene oxide adducts; cationic surface active agents such as cyclic amines, ester amides, quaternary ammonium salts, hydantoin derivatives, heterocyclic compounds, or phosphonium or sulfonium compounds; anionic surface active agents including acidic groups such as carboxylic acid, sulfonic acid, phosphoric acid, sulfuric acid ester groups, or phosphoric acid ester groups; and amphoteric surface active agents such as amino acids, amino sulfonic acids, sulfuric or phosphoric esters of amino alcohols or alkyl betaines.

Such surface active agents are disclosed in "Surface Active Agent Binran" by Sangyo Tosho Co., Ltd.

These lubricating agents and antistatic agents are not necessarily 100% pure, and may further contain impurities such as isomers, unreacted products, by-products, decomposed products, or oxides. The content of such impurities is preferably 30% or less, more preferably 10% or less.

The kinds and amounts of such lubricating agents and surface active agents can be changed, if desired. For example, when fatty acids having different melting points are used in the first and second magnetic layers, oozing out can be prevented. When esters having different boiling points or different polarities are used, oozing out can be prevented. When the amount of surface active agents is regulated, coating can be stabilized. When the amount of lubricating agents to magnetic particles is made larger in the first magnetic layer, lubricating effect can be improved.

Further, in the present invention, all of the additives or part of them can be added at any manufacturing step. For example, such additives can be mixed with magnetic particles prior to kneading steps, or can be mixed with magnetic particles, binders, and solvents at kneading steps, or can be added at dispersing steps, or can be added after dispersing steps, or can be added immediately before coating steps.

Such lubricating agents which can be used in the present invention are commercially available under the trade names of NAA-102, NAA-415, NAA-312, NAA-160, NAA-180, NAA-174, NAA-175, NAA-222, NAA-34, NAA-35, NAA-171, NAA-122, NAA-142, NAA-160, NAA-173K, Castor oil-cured fatty acid, NAA-42, NAA-44, Cation SA, Cation MA, Cation AB, Cation BB, Nymeen L-201, Nymeen L-202, Nymeen S-202, Nonion E-208, Nonion P-208, Nonion S-207, Nonion K-204, Nonion NS-202, Nonion NS-210, Nonion HS-206, Nonion L-2, Nonion S-2, Nonion S-4, Nonion 0-2, Nonion LP-20R, Nonion PP-40R, Nonion SP-60R, Nonion OP-80R, Nonion OP-85R, Nonion LT-221, Nonion ST-221, Nonion OT-221, Monoguri MB, Nonion DS-60, Anon BF, Anon LG, Butyl stearate, Butyl laurate, and erucic acid (which are produced by Nihon Yushi Co., Ltd.); Oleic acid produced by Kanto Chemical Co., Ltd.; FAL-205, FAL-123 produced by Takemoto Yubou Co., Ltd.; Enujerubu LO, Enujorubu IPM, and Sansosyzer E4030 (which are produced by Shin Nihon Rika Co., Ltd.); TA-3, KF-96, KF-96L, KF-96H, KF-410, KF-420, KF-965, KF-54, KF-50, KF-56, KF-907, KF-851, X-22-819, X-22-822, KF-905, KF-700, KF-393, KF-857, KF-860, KF-865, X-22-980, KF-101, KF-102, KF-103, X-22-3710, X-22-3715, KF-910, and KF-3935 (which are produced by Shinetsu Chemical Co., Ltd.); Armide P, Armide C, and Armoslip CP (which are produced by Lion Ahmer Co., Ltd.); Duomin TDO produced by Lion Yushi Co., Ltd.; BA-41G produced by Nisshin Seiyu Co., Ltd.; Profan 2012E, Newpole PE61, Ionet MS-400, Ionet MO-200, Ionet DL-200, Ionet DS-300, Ionet DS-300, Ionet DS-1000, and Ionet DO-200 (which are produced by Sanyo Kasei Co., Ltd.).

Examples of organic solvents which can be used in arbitrary proportions in the present invention include ketones such as acetone, methyl ethyl ketone, methyl isobutyl ketone, diisobutyl ketone, cyclohexanone, isophorone, or tetrahydrofuran; alcohols such as methanol, ethanol, propanol, butanol, isobutyl alcohol, isopropyl alcohol, or methyl cyclohexanol; esters such as methyl acetate, butyl acetate, isobutyl acetate, isopropyl acetate, ethyl lactate, or glycol acetate; glycol ethers such as glycol dimethyl ether, glycol monoethyl ether, or dioxane; aromatic hydrocarbons such as benzene, toluene, xylene, cresol, or chlorobenzene; chlorinated hydrocarbons such as methylene chloride, ethylene chloride, carbon tetrachloride, chloroform, ethylene chlorohydrin, or dichlorobenzene; N, N-dimethyl formamide; and hexane.

These organic solvents are not necessarily 100% pure, and may further contain impurities such as isomers, unreacted products, by-products, decomposed products, oxides, water, etc. The content of such impurities is preferably 30% by weight or less, more preferably 10% by weight or less.

If desired, the kinds and amounts of such organic solvents may be changed in the first and second magnetic layers. For example, when more volatile solvents are used for forming the first magnetic layer, its surface property can be increased. When solvents having higher surface tension (e.g., cyclohexanone, dioxane) are used for forming the first magnetic layer, coating is more stable. When solvents of higher solubility are used for forming the second magnetic layer, packing density can be raised.

In the magnetic recording medium of the present invention, the nonmagnetic support has a thickness of generally 1 to 100 microns, preferably 6 to 20 microns. The first magnetic layer has a thickness of generally 0.5 to 10 microns, preferably 1 to 5 microns. The second magnetic layer has a thickness of generally 1.5 microns or less, preferably 1.0 micron or less, more preferably 0.5 microns or less.

The thickness of the magnetic layers is generally 1/100 to 2 times that of the nonmagnetic support.

In order to increase adhesion between the nonmagnetic support and the first magnetic layer, there may be formed an intermediate layer such as an undercoating layer or an antistatic layer, containing carbon black. The thickness of such intermediate layer is generally 0.01 to 2 microns, preferably 0.05 to 0.5 microns. A backing layer may be provided on the opposite surface of the nonmagnetic support. The thickness of the backing layer is generally 0.1 to 2 microns, preferably 0.3 to 1.0 microns. As such intermediate layer and backing layer, conventional ones can be used.

Examples of the nonmagnetic supports used in the present invention include a film made of conventional materials such as polyesters (e.g., polyethylene terephthalate, polyethylene naphthalate), polyolefins, cellulose triacetate, polycarbonate, polyamide, polyimide, polyamide-imide, and polysulfone. These supports may be subjected in advance to corona-discharge treatment, plasma treatment, adhesion treatment, heating treatment, dust removing treatment, etc.

The nonmagnetic support used in the present invention has a center line average surface roughness (Ra) of generally 0.03 microns or less, preferably 0.02 microns or less, more preferably 0.01 microns or less, and has a cut-off value of 0.25 mm. It is preferred that such nonmagnetic support has a small center line average surface roughness, and also does not have a coarse projection of 1 micron or more.

The shape of the support surface can be controlled by adjusting the amount and size of fillers which are added to the support, if desired. Examples of such fillers include oxides or carbonates of Ca, Si, Ti, and organic particles such as acrylic resins.

The F-5 (i.e., the load at the 5% elongation) value of the nonmagnetic support in the tape-running direction is preferably 5 to 50 Kg/mm$^2$, and the F-5 value of it in the tape-width direction is preferably 3 to 30 Kg/mm$^2$.

The F-5 value in the tape-running direction is usually larger than that in the tape-width direction; however, if desired, the strength in the tape-width direction may be larger than that in the tape-running direction.

The heat shrinkage rate of the magnetic support in the tape-running as well as tape-width direction at 100° C. for 30 minutes is preferably 3% or less, more preferably 1.5% or less. The heat shrinkage rate at 80° C. for 30 minutes is preferably 1% or less, more preferably 0.5% or less. It is preferred that the breaking strength of the nonmagnetic support in both directions is preferably 5 to 100 Kg/mm$^2$, and the modulus of elasticity is preferably 100 to 2000 Kg/mm$^2$.

A manufacturing method of a magnetic coating composition for forming the magnetic recording medium of the present invention comprises a kneading step (i.e., a mixing step) and a dispersion step, and if desired, a mixing step which is positioned before or after these steps. Each of such steps may be separated into two or more steps.

In the present invention, all materials including magnetic particles, binders, carbon black, abrasive agents, antistatic agents, lubricating agents, or solvents may be added in the course of any of these steps. The individual materials may be added separately at two or more steps. For example, polyurethanes may be added separately at a kneading step, a dispersion step, and a mixing step for controlling viscosity.

In order to attain the object of the present invention, conventional manufacturing processes can be naturally used as a part of the manufacturing steps. When the kneading step is carried out by using devices having strong kneading power such as a continuous kneader or a pressure kneader, the magnetic recording medium of the present invention, which has a high residual magnetic flux density (Br), can be obtained.

When a continuous kneader or a pressure kneader is adopted, binders are preferably kneaded with magnetic particles in an amount of 15 to 500 parts per 100 parts of the magnetic particles. Details of such kneading treatment are disclosed in JP-A-1-106338 and JP-A-1-79274.

The second magnetic layer of the magnetic recording medium according to the present invention has a thickness of 1.5 microns or less. However, in order to obtain such thickness, when conventional successive coating methods in which the first magnetic layer is formed, followed by drying it, and then the second magnetic layer is formed thereon are adopted, it is difficult to effect good coating. To this end, in the present invention, the second magnetic layer having a thickness of 1.5 microns or less can be obtained using simultaneous coating methods disclosed in JP-A-62-212933 (The term "JP-A" as used herein means an "unexamined published Japanese patent application").

In order to obtain the SFD of the second magnetic layer of the present invention, it is necessary to conduct a strong magnetic orientation. It is preferred that both a solenoid of 1000 G or more and a cobalt magnet of 2000 G or more be used in combination. Further, it is preferred that proper drying steps are provided prior to magnetic orientation so that orientation property after drying can be maximized.

Conventional calendering treatments cannot provide the center line average surface roughness of the second magnetic layer of the present invention. The desired center line average surface roughness of the present invention can be obtained by passing the magnetic recording medium between metal rolls at a temperature of 80° C. or higher and under a linear pressure of 300 Kg/cm. Metal rolls are preferably used as calender rolls. However, rolls made of heat-resistant plastics such as epoxy, polyimide, polyamide, or polyimideamide may be used as calender rolls.

In the present invention, the calendering treatment temperature is preferably 80° C. or higher, more preferably 100° C. or higher.

The linear pressure is preferably 200 Kg/cm or more, more preferably 300 Kg/cm or more.

In the present invention, the friction coefficient of the magnetic layer surface and the opposite surface thereof, to stainless steel (SUS420J) is preferably 0.5 or less, more preferably 0.3 or less. The surface inherent resistance is preferably $1 \times 10^{-5}$ to $1 \times 10^{-12}$ ohm/sq.

The modulus of elasticity at 0.5% elongation of the magnetic layers is preferably 100 to 2000 Kg/mm$^2$ in the tape-running and tape-width directions. The breaking strength is preferably 1 to 30 Kg/cm$^2$. The modulus of elasticity of the magnetic recording medium is preferably 100 to 1500 Kg/mm$^2$ in the tape-running and tape-width directions. The residual elongation of the medium is preferably 0.5% or less. The heat shrinkage rate of the medium at a temperature of 100° C. or less is preferably 1% or less, more preferably 0.5% or less, most preferably 0.1% or less.

The residual solvent contained in the magnetic layers is preferably 100 mg/m$^2$ or less, more preferably 10 mg/m$^2$ or less. It is preferred that the residual solvent contained in the second magnetic layer is less than that in the first magnetic layer.

The void volume of the first and second magnetic layers is preferably 30% by volume or less, more preferably 10% by volume or less. It is preferred that the void volume of the first magnetic layer is larger than that of the second magnetic layer. However, if the void volume of the first magnetic layer is 5% or more, that of the first magnetic layer may be smaller than that of the second magnetic layer.

In the present invention, the physical properties of the first and second magnetic layers can be changed according to objectives. For example, the running durability can be improved by increasing the modulus of elasticity of the second magnetic layer, and the magnetic recording medium can maintain good contact with the magnetic head by lowering the modulus of elasticity of the first magnetic layer to be less than that of the second magnetic layer.

It is preferred that the coercive force (Hc) of the second magnetic layer be high to record short wavelengths. However, higher Hc is a disadvantage in recording long wavelengths, thus, lowering output.

In the present invention, the Br/Hc ratio is regulated, the packing density as well as the squareness ratio in the second magnetic layer are increased, and the Br is heightened. It follows that the electromagnetic characteristics are improved.

Further, the SFD of the second magnetic layer is made to be 0.6 or less, namely, the distribution of Hc is narrowed, with the result that a low Hc component which is liable to produce self-demagnetization and a high Hc component which is difficult for recording are decreased, and the magnetization content which attributes to the reproduction is increased. The Hc' of the first magnetic layer is controlled so that sufficient recording can be obtain without being affected by self-demagnetization. The magnetic particles of the second magnetic layer are of fine size and the center line average surface roughness is 1/10 or less of the average length in the long axis of the magnetic particles, so that noise is significantly reduced.

The present invention will be illustrated in more detail by the following Example. In all Examples, all parts are by weight.

EXAMPLE

Sample 1

Formulation of a magnetic coating composition for forming the first magnetic layer:

| | |
|---|---|
| Cobalt-modified iron oxide. (Hc: $3.5 \times 10^4$ A/m, Specific surface area: 30 m$^2$/g, Crystallite size: 400 angstrom, Particle size (Average length in the long axis): 0.25 microns, Acicular ratio: 10) | 100 parts |
| Vinyl chloride/vinyl acetate/maleic. anhydride copolymer (Compositional ratio: 86/13/1, Degree of polymerization: 400) | 10 parts |
| Polyester polyurethane resin | 5 parts |
| Carbon black (Average particle size: 0.05 microns) | 3 parts |
| Butyl stearate | 1 part |
| Stearic acid | 2 parts |
| Butyl acetate | 200 parts |

Formulation of a magnetic coating composition for forming the second magnetic layer:

| | |
|---|---|
| Cobalt-modified iron oxide (Hc: $5.0 \times 10^4$ A/m, Specific surface area: 35 m$^2$/g, Crystallite size: 350 angstrom, Particle size (Average length in the long axis): 0.20 microns, Acicular ratio: 12) | 100 parts |
| Vinyl chloride/vinyl acetate/maleic anhydride copolymer (Compositional ratio: 86/13/1, Degree of polymerization: 400) | 12 parts |
| Polyester polyurethane resin (Carboxyl group content: $10^{-4}$ mol/g) | 6 parts |
| Alpha-alumina (Average particle size: 0.3 microns) | 3 parts |
| Carbon black (Average particle size: 0.10 microns) | 3 parts |
| Butyl stearate | 1 part |
| Stearic acid | 2 parts |
| Butyl acetate | 200 parts |

Each of the above two magnetic coating compositions was mixed, kneaded, and then dispersed using a sand mill. 5 parts of polyisocyanate ("Coronate L3040" manufactured by Nippon Polyurethane Co., Ltd.) and 40 parts of butyl acetate were added to the dispersion thus obtained for forming the first magnetic layer, and then filtered off using a filter having an average aperture size of 1 micron to prepare the magnetic coating composition for the first magnetic layer. 6 parts of polyisocyanate and 40 parts of butyl acetate were added to the dispersion thus obtained for forming the second magnetic layer, and then filtered off using a filter having an average aperture size of 1 micron to prepare the magnetic coating composition for the second magnetic layer.

The magnetic coating composition for the first magnetic layer was coated, in a dry thickness of 3.0 microns, on a polyethylene terephthalate support having a thickness of 15 microns and having a center line average surface roughness of 0.01 microns. Immediately after the coating, the magnetic coating composition for the second magnetic layer was coated, in a dry thickness of 1.0 micron, on the first magnetic layer to form the second magnetic layer using a simultaneous multiple layer coating method. While both magnetic layers were wet, they were subjected to magnetic orientation using a cobalt magnet having a magnetic force of 3000 G and using a solenoid having a magnetic force of 1500 G. After drying, it was treated with a calender of 7 steps consisting of metal rolls at a temperature of 90° C. and a linear pressure of 300 Kg/cm, and slit to a ½ inch width to prepare a video tape.

The video tape thus obtained is referred to as a Sample 1, and the characteristics thereof are shown in Table 1.

Samples 2 to 26

The same procedure as that in Sample 1 was repeated to prepare Samples 2 to 26, except that Hc of the second magnetic layer, Br, Br/Hc, SFD, an average length in the long axis of magnetic particles, the thickness, a center line average surface roughness, and Hc' of the first magnetic layer were changed to that shown in Table 1.

Among these, the tape of Sample 3 was produced in the same manner as in Sample 1, except that the butyl acetate used in the second magnetic layer was reduced to 150 parts, a continuous kneader treatment was carried out, stronger mixing and kneading than that in Sample 1 were conducted, and then 50 parts of the residual butyl acetate was added thereto.

The tapes of Samples 4 and 5 were produced in the same manner as in Sample 1, except that ferromagnetic alloy particles were used.

The tapes of Samples 6, 7, and 8 were produced in the same manner as in Sample 1, except that the content of butyl acetate was controlled, a continuous kneader treatment was conducted, and Br was changed.

The tapes of Samples 9, 10, and 11 were produced in the same manner as in Sample 1, except that an adhesive speed of cobalt was changed, and the Hc distribution of magnetic particles was changed.

The tapes of Samples 16 and 17 were produced in the same manner as in Sample 1, except that calendering was conducted at a temperature of 100° C., and 120° C., and a center line average surface roughness was changed.

The tape of Sample 22 was produced in the same manner as in Sample 1, except that Br'/Hc' of the first magnetic layer was made to be $3 \times 10^{-6}$ H/m, a SFD was made to be 0.2, an average length in the long axis of magnetic particles was made to be 0.25 microns, and the thickness was made to be 2.5 microns.

The tape of Sample 23 was produced in the same manner as in Sample 1, except that Br'/Hc' of the first magnetic layer was made to be $4 \times 10^{-6}$ H/m, a SFD was made to be 0.4, an average length in the long axis of magnetic particles was made to be 0.3 microns, and the thickness was made to be 3.5 microns.

The tape of Sample 26 was produced in the same manner as in Sample 1, except that the composition of the conventional single magnetic layer was the same as that of the second magnetic layer in Sample 1.

Mixing and kneading for the tape of Sample 26 were carried out using a three-roll mill, coating was conducted using a gravure coating, and calendering was conducted using a conventional method in which a metal roll and a plastic roll was adopted.

TABLE-1

| Sample No. | Second magnetic layer Hc × 10$^4$ (A/m) | Br × 10$^{-1}$ (wb/m$^2$) | Br/Hc × 10$^{-6}$ (H/m) | SFD | Average length in the long axis of magnetic particles | Thickness | First magnetic layer Hc' × 10$^4$ (A/m) | Center line average surface roughness of second magnetic layer Ra (μm) | BF Output (dB) | YS/N (dB) | Chroma output (dB) | Chroma S/N (dB) | |
|---|---|---|---|---|---|---|---|---|---|---|---|---|---|
| 1 | 5.0 | 1.2 | 2.5 | 0.65 | 0.20 | 1.0 | 3.5 | 0.016 | 0.0 | +0.1 | 1.1 | 1.1 | Comparison |
| 2 | 5.5 | 1.5 | 3 | 0.5 | 0.20 | 1.0 | 5.2 | 0.016 | 1.1 | 1.2 | 1.2 | 1.2 | Invention |
| 3 | 7.0 | 2.1 | 3 | 0.5 | 0.20 | 1.0 | 5.2 | 0.016 | 1.4 | 1.4 | 1.4 | 1.3 | " |
| 4 | 12.0 | 3.6 | 3 | 0.5 | 0.18 | 1.0 | 5.2 | 0.016 | 2.1 | 1.8 | 1.5 | 1.5 | " |
| 5 | 15.0 | 3.0 | 2 | 0.5 | 0.18 | 1.0 | 5.2 | 0.016 | 2.4 | 2.1 | 1.4 | 1.5 | " |
| 6 | 7.0 | 1.2 | 1.7 | 0.5 | 0.20 | 1.0 | 5.2 | 0.016 | 0.9 | 0.9 | 0.7 | 0.6 | Comparison |
| 7 | 7.0 | 1.4 | 2.0 | 0.5 | 0.20 | 1.0 | 5.2 | 0.016 | 1.1 | 1.1 | 1.1 | 1.1 | Invention |
| 8 | 7.0 | 1.8 | 2.6 | 0.5 | 0.20 | 1.0 | 5.2 | 0.016 | 1.7 | 1.7 | 1.8 | 1.9 | " |
| 9 | 7.0 | 2.1 | 3 | 0.7 | 0.20 | 1.0 | 5.2 | 0.016 | 0.5 | 0.6 | 0.7 | 0.5 | Comparison |
| 10 | 7.0 | 2.1 | 3 | 0.3 | 0.20 | 1.0 | 5.2 | 0.016 | 1.6 | 1.5 | 1.6 | 1.6 | Invention |
| 11 | 7.0 | 2.1 | 3 | 0.2 | 0.20 | 1.0 | 5.2 | 0.016 | 1.8 | 1.7 | 1.6 | 1.7 | " |
| 12 | 7.0 | 2.1 | 3 | 0.5 | 0.30 | 1.0 | 5.2 | 0.024 | 1.3 | 0.4 | 1.1 | 1.0 | Comparison |
| 13 | 7.0 | 2.1 | 3 | 0.5 | 0.25 | 1.0 | 5.2 | 0.020 | 1.3 | 1.0 | 1.2 | 1.2 | Invention |
| 14 | 7.0 | 2.1 | 3 | 0.5 | 0.15 | 1.0 | 5.2 | 0.012 | 1.3 | 1.7 | 1.4 | 1.4 | Invention |
| 15 | 7.0 | 2.1 | 3 | 0.5 | 0.20 | 1.0 | 5.2 | 0.030 | 0.6 | 0.7 | 1.0 | 0.4 | Comparison |
| 16 | 7.0 | 2.1 | 3 | 0.5 | 0.20 | 1.0 | 5.2 | 0.010 | 1.7 | 1.7 | 1.5 | 1.8 | Invention |
| 17 | 7.0 | 2.1 | 3 | 0.5 | 0.20 | 1.0 | 5.2 | 0.005 | 1.9 | 1.9 | 1.5 | 2.1 | " |
| 18 | 7.0 | 2.1 | 3 | 0.5 | 0.20 | 0.5 | 5.2 | 0.014 | 1.6 | 1.6 | 1.5 | 1.5 | " |
| 19 | 7.0 | 2.1 | 3 | 0.5 | 0.20 | 1.5 | 5.2 | 0.018 | 1.2 | 1.2 | 1.2 | 1.1 | " |
| 20 | 7.0 | 2.1 | 3 | 0.5 | 0.20 | 1.0 | 6.5 | 0.016 | 1.4 | 1.5 | 1.1 | 1.2 | " |
| 21 | 7.0 | 2.1 | 3 | 0.5 | 0.20 | 1.0 | 3 | 0.016 | 1.4 | 1.5 | 1.7 | 1.8 | " |
| 22 | 7.0 | 2.1 | 3 | 0.3 | 0.20 | 1.0 | 5.2 | 0.016 | 1.7 | 1.5 | 1.5 | 1.5 | Invention |
| 23 | 7.0 | 2.1 | 3 | 0.3 | 0.20 | 1.0 | 5.2 | 0.016 | 1.5 | 1.4 | 1.7 | 1.7 | " |
| 24 | 7.0 | 2.1 | 3 | 0.3 | 0.20 | 1.0 | 0.5 | 0.016 | 0.6 | 0.7 | 1.4 | 1.4 | Comparison |
| 25 | 7.0 | 2.1 | 3 | 0.3 | 0.20 | 1.0 | 20.0 | 0.016 | 1.1 | 1.0 | 1.2 | 0.2 | " |
| 26 | 7.0 | 1.2 | 1.7 | 0.5 | 0.20 | 4.0 | — | 0.030 | 0.0 | 0.0 | 0.0 | 0.0 | " |

EVALUATION

RF output

Video signals of image signals 50 IRE were recorded with standard image recording currents. The mean value of the envelope of the reproduced RF output was measured using an oscilloscope ("2445" produced by Sony Techtronics Co., Ltd.), and calculated by the following equation.

RF output (dB) = $20 \log_{10} V/V_o$
V: Mean value
$V_o$: Standard value

Chroma output

Chroma signals were superposed upon video signals of image signals 50 IRE, and recorded with standard image recording currents. The mean value of the envelope of the reproduced RF chroma output was measured using an oscilloscope ("2445" produced by Sony Techtronics Co., Ltd.), and calculated in a similar manner as above.

S/N ratio

It was measured using a noise meter ("925 R" produced by Shibasoku Co., Ltd.). The results are shown in Table 1 as relative values as compared to a tape of Sample 26 which was used as a standard tape. The tapes were recorded with a video tape recorder "NV-8300" produced by Matsushita Electric Industrial Co., Ltd.

Hc and Br

They were measured at Hm 2 K Oe using a vibrating sample magnetometer ("VSM-III" produced by Toei Kogyo Co., Ltd.).

Center line average surface roughness

It was measured at a cut-off of 0.025 mm using a three-dimensional surface roughness meter ("SE-3AK" produced by Kosaka Laboratory Co., Ltd.).

Average length in the long axis of magnetic particles

It was measured using an electron microscope ("JEM-100C" produced by Japan Electron Optics Laboratory Co., Ltd.).

Crystallite size

Using an X-ray diffraction, it was calculated by measuring the spread amount of the half-width of diffraction lines in crystal plane (4, 4, 0) and crystal plane (2, 2, 0).

As is apparent from the results shown in Table 1, it can be seen that Samples Nos. 1, 6, 9, 12, 15, and 24 to 26 (in which all of Hc, Br, Br/Hc, SFD, and average length in the long axis of magnetic particles, of the second magnetic layer, and the Hc and center line average surface roughness, of the first magnetic layer are not within the present invention) cannot satisfy all of RF output, YS/N, chroma output, and chroma S/N. On the other hands, samples according to the present invention can satisfy all of RF output, YS/N, chroma output, and chroma S/N.

While the invention has been described in detail and with reference to specific embodiments thereof, it will be apparent to one skilled in the art that various changes and modifications can be made therein without departing from the spirit and scope thereof.

What is claimed is:

1. A magnetic recording medium having at least two magnetic layers comprising first and second magnetic layers which are successively formed in order on a nonmagnetic support, wherein a coercive force (Hc) of said second magnetic layer is $5 \times 10^4$ to $1.5 \times 10^5$ A/m, a ratio (Br/Hc) of a residual magnetic flux density (Br) of said second magnetic layer to the coercive force (Hc) is $2.0 \times 10^{-6}$ H/m or more, SFD of said second magnetic layer is 0.6 or less, an average length in the long axis of magnetic particles in said second magnetic layer is 0.25 microns or less, a center line average surface roughness (Ra) of said second magnetic layer is 1/10 or less of the average length in the long axis of the magnetic particles, and a coercive force (Hc') of said first magnetic layer is $2 \times 10^4$ to $1 \times 10^5$ A/m.

2. The magnetic recording medium as in claim 1, wherein SFD is 0.5 or less.

3. The magnetic recording medium as in claim 1, wherein the coercive force of the first magnetic layer is lower than the coercive force of the second magnetic layer.

4. The magnetic recording medium as in claim 1, wherein the thickness of the second magnetic layer is 1.5 microns or less.

5. The magnetic recording medium as in claim 1, wherein the center line average height (Ra) of the second magnetic layer is 1/20 or less of the average length in the long axis of the magnetic particles.

6. A magnetic recording medium as in claim 1, wherein the average length of the long axis of the magnetic particles in the second magnetic layer is 0.20 microns or less.

7. The magnetic recording medium as in claim 1, wherein the specific surface area of the magnetic particles of the second magnetic layer is 25 to 80 m²/g.

8. The magnetic recording medium as in claim 1, wherein the crystallite size of the magnetic particles of the second magnetic layer is 450 to 100 Å.

9. The magnetic recording medium as in claim 1, wherein the sguareness ratio of the second magnetic layer in the tape-running direction is 0.70 or more.

10. The magnetic recording medium as in claim 1, wherein in the first and second magnetic layers, the squareness ratios in the direction perpendicular to the tape-running direction is 80% or less of the values in the tape-running direction.

11. The magnetic recording medium as in claim 1, wherein the saturation magnetization of magnetic particles in the second magnetic layer is 50 emu/g or more.

12. The magnetic recording medium as in claim 1, wherein the r/500 of the magnetic particles in the second magnetic layer is less than that of the first magnetic layer and is 1.5 or less.

13. The magnetic recording medium as in claim 1, wherein the r/500 of the magnetic particles in the first and second magnetic layer is 1.0 or less.

14. The magnetic recording medium as in claim 1, wherein the magnetic particles in the first and second magnetic layer have a water content of 0.01 to 2%.

15. The magnetic recording medium as in claim 1, wherein the coercive force of the second magnetic layer is $6 \times 10^4$ to $1.5 \times 10^5$ A/m.

* * * * *